(12) United States Patent
Lee et al.

(10) Patent No.: US 8,552,117 B1
(45) Date of Patent: Oct. 8, 2013

(54) SEALING ELEMENTS AND SEALING ELEMENT COMPOSITIONS

(75) Inventors: Biing-Lin Lee, Cranston, RI (US); Kevin G. Cai, Cumberland, RI (US); Edward T. Kopesky, Arlington, MA (US)

(73) Assignee: Teknor Apex Company, Pawtucket, RI (US)

( * ) Notice: Subject to any disclaimer, the term of this patent is extended or adjusted under 35 U.S.C. 154(b) by 0 days.

(21) Appl. No.: 13/495,503

(22) Filed: Jun. 13, 2012

(51) Int. Cl.
*C08L 23/08* (2006.01)

(52) U.S. Cl.
USPC ........... 525/236; 525/240; 525/241; 525/274; 525/296; 525/553; 525/577; 526/348.6; 526/347

(58) Field of Classification Search
USPC .......... 525/236, 240, 241; 524/578, 274, 296, 524/553, 577; 526/348.6, 347
See application file for complete search history.

(56) References Cited

U.S. PATENT DOCUMENTS

| | | |
|---|---|---|
| 3,183,144 A | 5/1965 | Caviglia |
| 3,300,072 A | 1/1967 | Caviglia |
| 3,414,938 A | 12/1968 | Caviglia |
| 3,493,453 A | 2/1970 | Ceresa et al. |
| 3,779,965 A | 12/1973 | Lefforge et al. |
| 3,786,954 A | 1/1974 | Shull |
| 4,085,186 A | 4/1978 | Rainer |
| 4,529,740 A | 7/1985 | Trainor |
| 4,619,848 A | 10/1986 | Knight et al. |
| 4,717,034 A | 1/1988 | Mumford |
| 4,744,478 A | 5/1988 | Hahn |
| 4,807,772 A | 2/1989 | Schloss |
| 4,872,573 A | 10/1989 | Johnson et al. |
| 4,939,859 A | 7/1990 | Bradt |
| 4,981,231 A | 1/1991 | Knight |
| 4,984,703 A | 1/1991 | Burzynski |
| 5,000,992 A | 3/1991 | Kelch |
| 5,104,710 A | 4/1992 | Knight |
| 5,137,164 A | 8/1992 | Bayer |
| 5,215,587 A | 6/1993 | McConnellogue et al. |
| 5,844,045 A | 12/1998 | Kolthammer et al. |
| 5,869,575 A | 2/1999 | Kolthammer et al. |
| 6,448,341 B1 | 9/2002 | Kolthammer et al. |
| 6,538,070 B1 | 3/2003 | Cardwell et al. |
| 6,545,088 B1 | 4/2003 | Kolthammer et al. |
| 6,566,446 B1 | 5/2003 | Parikh et al. |
| 7,608,668 B2 | 10/2009 | Li Pi Shan et al. |
| 7,671,106 B2 | 3/2010 | Markovich et al. |
| 7,960,007 B2 | 6/2011 | Lee |
| 2006/0229402 A1 * | 10/2006 | Varma .......................... 524/490 |
| 2007/0219334 A1 | 9/2007 | Li Pi Shan et al. |
| 2010/0069574 A1 | 3/2010 | Shan et al. |
| 2010/0298515 A1 | 11/2010 | Marchand et al. |
| 2010/0317804 A1 * | 12/2010 | Karjala et al. ................ 525/240 |
| 2011/0204016 A1 | 8/2011 | Lee |

FOREIGN PATENT DOCUMENTS

| | | | | |
|---|---|---|---|---|
| EP | 1 816 086 | * | 8/2007 | ............ B65D 53/00 |
| EP | 1816086 A1 | | 8/2007 | |
| JP | 2000038495 A2 | | 2/2000 | |

* cited by examiner

*Primary Examiner* — Robert D. Harlan
(74) *Attorney, Agent, or Firm* — Hudak, Shunk & Farine Co. LPA

(57) ABSTRACT

Polyolefin based sealing element compositions with good oxygen barrier properties particularly suitable for forming sealing elements, for example gaskets and cap liners that are especially useful for sealing containers having products such as liquids or food-stuffs therein. The compositions when formed as sealing elements do not appreciably contribute taste and/or odor to a packaged product including the sealing element. The compositions have desirable rheological properties and are thus readily processable at various temperatures.

15 Claims, 2 Drawing Sheets

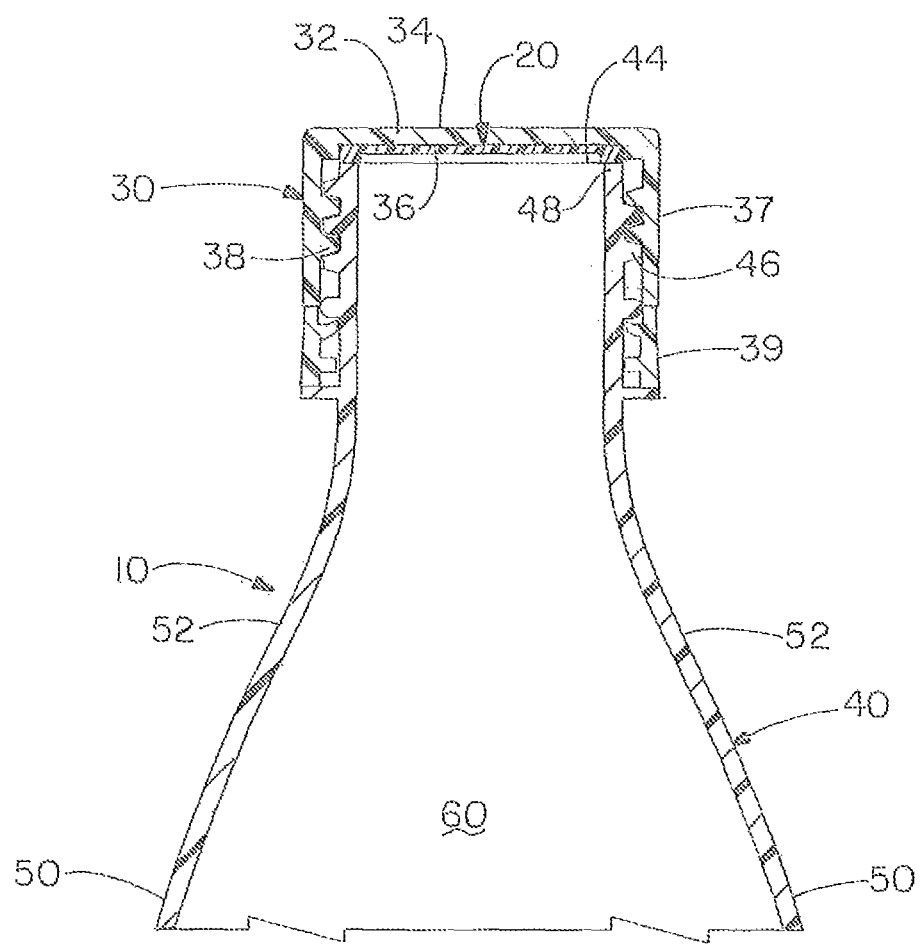
FIG.—1
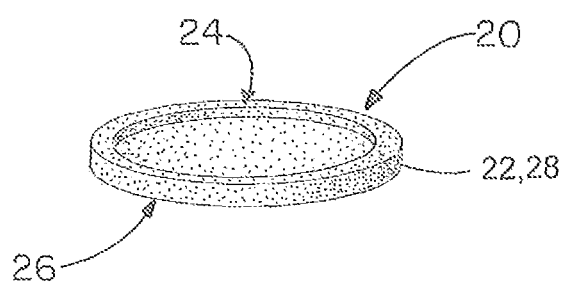
FIG.—2A

SEALING ELEMENTS AND SEALING ELEMENT COMPOSITIONS

FIELD OF THE INVENTION

The present invention relates to polyolefin-based sealing element compositions particularly suitable for forming sealing elements, for example gaskets and cap liners, that surprisingly also provide desirable oxygen barrier properties and are especially useful for sealing containers having products such as liquids or food-stuffs therein. The compositions when formed as sealing elements do not appreciably contribute taste and/or odor to a packaged product including the sealing element. The compositions have desirable rheological properties and are thus readily processable at various temperatures.

BACKGROUND OF THE INVENTION

Many different polymer-based compositions have been utilized to form sealing elements for applications such as foodstuff applications both liquid and dry commodities, medical products and nutritional products. Examples of such polymers are polyolefins, polyvinyl halides such as polyvinyl chloride and polyvinylidene chloride, elastomers and, various rubbers such as EPDM, polyesters, polycarbonate. Techniques used to manufacture sealing elements are set forth, for examples, in U.S. Pat. Nos. 3,183,144; 3,300,072; 3,414,938; 3,493,453; 3,779,965; 3,786,954; 4,085,186; 4,619,848; 4,717,034; 4,939,859; 4,981,231; 4,984,703; 5,000,992; 5,104,710; 5,137,164; and 5,215,587 all herein incorporated by reference.

In one embodiment, sealing elements in the form of a single layer or liner are made by extruding a polymer composition, cutting and placing a quantity of the extrudate at a desired location, such as in the center of a cap, followed by compression molding the extrudate into a gasket or liner. In other embodiments, injection molding can be utilized to form a sealing element in the form of a seal ring, for example, in a cap.

Properties required of the sealing elements can vary depending upon individual applications. For example, sealing elements subject to retort conditions, such as relatively high temperatures and pressures, are generally required to withstand the retort process without failing, maintain a suitable oxygen barrier for a desired lifespan of the product and also be easily removable from the container when desired by a consumer or other user. Regardless of whether or not retort conditions are encountered, the sealing element should provide for adequate sealing at a wide range of temperatures, especially high temperatures. Various sealing elements should also provide desirable sealing properties during stacking and a reasonable oxygen barrier property when required to preserve freshness of a packaged item, such as a foodstuff. Some sealing elements must be resistant to acids or bases. Sealing elements whether designed for a single use or a multiple use item should retain their integrity and not shred or tear in order to prevent contamination of the packaged products. Further, seal elements should have good compression set to impart sealing capability and not lose seal integrity. Numerous attempts to provide sealing elements had been disclosed.

U.S. Pat. No. 7,960,007 and U.S. Patent Publication No. 20110204016 relate to retort liners and containers including a container body such as a bottle or jar, a closure, and the retort liner, wherein the retort liners exhibit attractive properties such as low compression set under retort conditions, desirable adhesion to a polymeric closure such as a cap or lid, and beneficial oxygen barrier properties. In particular, the retort liners are thermoplastic elastomers formed from compositions including one or more styrenic block copolymers, one or more polyolefins and a softener. In a preferred embodiment, the retortable containers are all plastic packages, wherein the bottle or jar and the closure are thermoplastic compositions and the liner is a thermoplastic elastomer composition.

U.S. Pat. No. 4,807,772 relates to a polypropylene compression molded closure with an elastomer liner that is removable, the elastomer being a blend of polyethylene and a rubbery copolymer, containing oil.

U.S. Pat. No. 4,872,573 relates to a moldable plastic closure comprising a selectively foamed, unitarily molded layer and at least one layer of barrier resin adapted to retard the migration of oxygen-containing gasses through the closure.

U.S. Pat. No. 5,000,992 relates to a plastic container closure, such as a bottle cap liner or tamper evident seal, formed from a coextruded multilayer foamed film. The coextruded multilayer foamed film has at least one solid film layer of a first polyolefin blend containing linear low density polyethylene, low density polyethylene, and, optionally high density polyethylene, and at least one foamed layer of a second polyolefin blend containing linear low density polyethylene, low density polyethylene, and optionally ethylene vinyl acetate. The multilayer foamed film may be coextruded using a blown film or cast film extrusion process under defined conditions. The coextruded multilayer foamed film may be laminated to other materials such as polyester film, thermoplastic adhesive films or metallic films and used as a plastic container closure, or may be applied as a liner to a plastic bottle cap.

U.S. Pat. No. 3,786,954 relates to a cap liner disclosed for use with a closure cap in sealing a container. The liner is cut from a foamed polyethylene sheet material. It reportedly provides a seal for products such as fine powdered products where leakage has been experienced with prior liners. The foamed liner material reportedly has dynamic cushioning properties so that a tight seal is maintained at all times including handling and shipping operations of the sealed package. One embodiment of the closure is a laminate of the foamed sheet material and a thin air impervious film.

U.S. Pat. No. 5,104,710 relates to a gasket of thermoplastic material moulded in a polypropylene cap, wherein the adhesion of the gasket to the cap at temperatures below 200° C. is reportedly improved by including an adhesion-promoting polymer of propylene in the thermoplastic composition.

U.S. Pat. No. 4,529,740 relates to hot melt compositions disclosed from which foamed products having a fine and uniform void structure therein can be obtained. The compositions include a thermoplastic polymer preferably an elastomer such as a styrene-butadiene block copolymer, and a small amount of a salt of a sulfonated styrene polymer. Plasticizing processing aids, tackifying agents and antioxidants can be included in the compositions, as well as in addition surfactants such as dodecylbenzene sulfonate. The composition can be mixed with gaseous blowing agents by suitable means and dispensed to produce foamed products reportedly suited for example as sealants in closures for containers.

U.S. Pat. No. 4,744,478 relates to a molded polymeric container closure comprising at least one substantially unfoamed polymer layer and an integrally molded foamed layer of the same polymer.

Numerous olefin block copolymers and olefin block copolymer containing compositions are described in U.S. patent and Publication Nos. U.S. Pat. Nos. 7,671,106; 7,608,668; 6,566,446; 6,545,088; 6,538,070; 6,448,341; 5,869,575; 5,844,045; 2010/0298515; 2010/0069574; and 2007/

0219334. These disclosures set forth a plethora of various potential applications, end uses, and general components that can be combined therewith.

U.S. Pat. No. 7,671,106 relates to cap liners, closures and gaskets for multi-block polymers, i.e. olefin block copolymers. The polymer composition comprises at least an ethylene/alpha-olefin interpolymer and at least one other polymer. The other polymer can be selected from a second ethylene/alpha-olefin interpolymer, an elastomer, a polyolefin, a polar polymer, and an ethylene/carboxylic acid interpolymer or ionomer thereof. The ethylene/alpha-olefin interpolymer is a block copolymer having at least a hard block and at least a soft block. The soft block comprises a higher amount of comonomers than the hard block. The block interpolymer has a number of unique characteristics disclosed here. Also provided are gaskets, bottle cap liners, and closures that comprise or are obtained from a composition comprising at least one ethylene/alpha-olefin interpolymer and at least one polyolefin. The gaskets are reportedly capable of compression sealing various containers, without contaminating the contents. Liquid containers reportedly particularly benefit from the use of the novel gasket materials disclosed herein.

In view of the above, a problem still exists as economical sealing elements especially polyolefin-based sealing elements, are needed that are formed from compositions providing broad processing windows for depositing a sealing element bead, for example in a closure or cap, and further forming a sealing element, such as a liner, having desirable barrier properties, particularly when using a container and/or closure formed from a substantially homopolymer polyolefin. It is a difficult challenge to meet the processing requirements to make a sealing element, as well as the performance requirements needed when the sealing element is in a packaged state. Additionally, there is a need for sealing elements that are formed from polyolefin compositions that are readily processable under desired conditions that do not contribute to one or more of taste and odor of the packaged product, provide desirable compression set properties to ensure good sealing, provide good adhesion to a polymeric cap or closure, and provide oxygen barrier properties, which are especially useful in foodstuff applications.

SUMMARY OF THE INVENTION

In view of the above, it is an object of the present invention to provide polyolefin-based sealing element compositions that can be processed at a wide range of temperatures to form sealing elements.

An additional object of the present invention is to provide sealing elements and sealing element compositions that are polyolefin-based and comprise a greater amount of polyolefin (s), preferably substantially homopolymer polyolefins(s), compared to any other polymeric component present such as an elastomer and olefin block copolymer, yet provide desirable oxygen barrier properties.

Still another object of the present invention is to provide sealing element compositions and sealing elements that do not appreciably contribute to the taste and/or odor of the packaged product. A further object of the present invention is to provide sealing elements that can be used in both retort and non-retort applications, for example, hot fill.

An additional object of the present invention is to provide sealing element compositions and sealing elements formed therefrom utilizing a variety of different polyolefins having different properties, for example melt indices that contribute to the various desirable properties of the formed sealing elements.

Yet another object of the present invention is to provide sealing elements offering pleasing natural color characteristics, for example in the form of translucent-like sealing elements.

A further object of the present invention is to provide sealing elements that can be formed by one or more of compression molding and injection molding.

An additional object of the present invention is to provide a polyolefin-based sealing element composition and sealing elements therefrom that contain in one embodiment, considering all polymeric components, a greater amount of one or more polyolefins compared to any other polymeric components, and a greater amount of an olefin block copolymer in relation to a styrenic block copolymer.

Still another object of the present invention is to provide sealing elements and compositions having less than 50 parts, or less than 40 parts or less than 37 parts by weight of an olefin block copolymer based on 100 parts by weight of all polymeric components in the composition.

Another object of the present invention is to provide sealing elements and compositions having less than 40 parts by weight or less than 35 parts by weight of an olefin block copolymer based on 100 parts by weight of the total composition.

Another object of the present invention is to provide sealing elements and compositions having less than 50 parts, or less than 40 parts or less than 30 parts by weight of a styrenic block copolymer based on 100 parts by weight of all polymeric components in the composition.

Yet an additional object of the invention in one embodiment is to provide a sealing element composition including one or more polyolefins, a styrenic block copolymer, an olefin block copolymer and a friction reducing agent.

In one aspect of the present invention, a polymeric sealing element comprising or obtainable from a composition is disclosed, comprising a styrenic block copolymer; an olefin block copolymer; polyolefin polymers comprising a first polyolefin polymer having a melt index less than 10 grams per 10 min; a second polyolefin polymer having a melt index greater than 10 grams per 10 min, and a softener, wherein the olefin block copolymer and the styrenic block copolymer are each present in an amount of less than 50 parts by weight per 100 parts by weight of the total polymer of the polyolefin polymers, the olefin block copolymer and the styrenic block copolymer and wherein the polyolefin polymer is present in an amount by weight greater than each of the amounts of the styrenic block copolymer and olefin block copolymer, wherein melt index is determined according to ASTM D-1238.

In a further aspect of the present invention, a polymeric sealing element comprising or obtainable from a composition is disclosed, comprising a polyolefin polymer; an olefin block copolymer; a styrenic block copolymer; and a softener, wherein the olefin block copolymer and the sytrenic block copolymer are each present in an amount of less than 50 parts by weight per 100 parts by weight of the total polymer of the polyolefin polymer, the olefin block copolymer and the styrenic block copolymer, wherein the polyolefin polymer is present in an amount greater than each of the amount of the styrenic block copolymer and the olefin block copolymer, and wherein the olefin block copolymer is present in an amount less than 40 parts per 100 parts by weight of the composition.

In another aspect of the present invention, a sealing element is disclosed comprising a polymeric layer having a first side and a second side, the polymeric layer comprising a polyolefin polymer; an olefin block copolymer; a styrenic block copolymer; and a softener, wherein the olefin block copolymer and the sytrenic block copolymer are each present in an amount of less than 50 parts by weight per 100 total parts of the total polymer of polyolefin polymer, olefin block copolymer and styrenic block copolymer, wherein the polyolefin polymer is present in an amount greater than the amount of the styrenic block copolymer and the olefin block copolymer, and wherein the olefin block copolymer is present in an amount less than 40 parts per 100 parts by weight of the sealing element.

BRIEF DESCRIPTION OF THE DRAWINGS

The invention will be better understood and other features and advantages will become apparent by reading the detailed description of the invention, taken together with the drawings, wherein:

FIG. 1 is a cross-sectional side elevational view schematically illustrating one embodiment of a container sealed with a sealing element of the present invention that is located inside of a closure of the container; and FIGS. 2A-2C are side perspective views illustrating embodiments of different sealing, elements of the present invention, wherein FIG. 2A illustrates a sealing element formed as a liner pad having a relatively thick rim portion, wherein FIG. 2B illustrates a sealing element formed as a sealing ring having an aperture or a hollow center, and wherein FIG. 2C is a sealing element formed as a liner pad having a substantially constant thickness.

DETAILED DESCRIPTION OF THE INVENTION

Figure 2B:
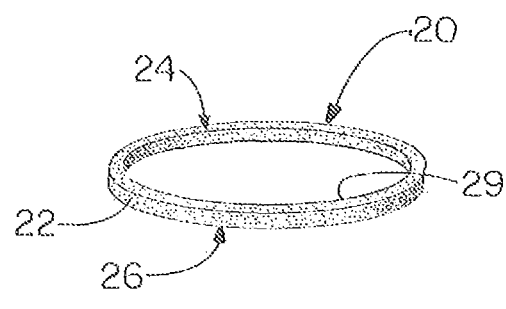
Figure 2C:
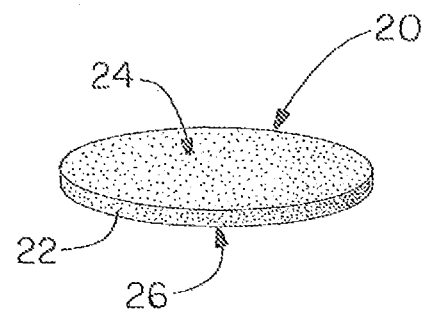

Referring now to the Figures, one embodiment of a container 10 with a sealing element 20 is shown in FIG. 1 and sealing elements 20 are shown in FIGS. 2A-2C. The container 10 has a body 40 that is adapted to be filled with a beverage, foodstuff, or another desired item, and sealed with a closure 30, wherein a sealing element 20 is provided to seal an opening 44 in the container body 40. Preferably, the sealing element 20 is situated between the closure 30 and the opening 44 in the container body 40 in one embodiment, when the closure 30 is connected to the body 40.

The closure 30 of the container 10 is generally a cap or lid which, in a preferred embodiment, is adapted to have the liner adhered to a surface thereof, with or without the use of one or more adhesives. The closure 30 illustrated in FIG. 1 includes a generally annular or circular top portion 32 having an upper surface 34 and a lower surface 36, with the sealing element 20 being in contact with at least a portion of the lower surface 36. The closure 30 has a substantially cylindrical skirt 37 extending downwardly from the top portion and integrally formed therewith. The skirt includes an interior surface and an exterior surface, with the exterior surface being provided with ribs, protrusions or indentations in one embodiment which can aid in sealing the closure 30 to the container 10. In one embodiment, a thread 38 is formed in the inner wall of the skirt that mates with a thread 46 formed on the outer wall of the neck portion of the container body 40 shown in FIG. 1. Although threads are shown in the drawings and utilized in one preferred embodiment, those of ordinary skill in the art will recognize that other methods of securing the closure 30 and sealing element 20 contained therein to the container body 40 may also be utilized, such as a snap-on configuration. The thread 46 may have one of a variety of thread configurations, such as a single helix, double helix, triple helix, or other multiple helixes, as are known in the art.

In one embodiment of the present invention, a tamper evident band 39 may be formed on the lower portion of the skirt and may include ratchet teeth that engage mating ratchet teeth formed in the neck of the container.

The sealing element 20 in one embodiment has a lower surface 26 adapted to contact a portion of the container body 40 and an upper surface 24 that abuts the top interior lower surface 36 of the closure and is sized to fit firmly within the closure. In one embodiment such as shown in FIG. 2A, the diameter or peripheral edge 22 of the sealing element is large enough that the sealing element 20 can be held within the cap without the need for a bonding material. In other embodiments, the sealing element may be optionally adhered, if desired, such as on its upper surface 24, to the closure by a variety of means such as known in the art, for example a thin layer of adhesive, glue or similar bonding material. The composition of the sealing element should be sufficient that the material be pliable or elastic and can be compressed between the closure and the container, but also sufficiently resilient so that the material can recover from a compressed state at ambient temperature and pressure conditions as well as under stress temperature in pressure conditions, such as are present during a retort process. The sealing element should have sufficient elasticity so it can conform to any distortions in the container body, such as at the container lip 48, for example molding nubs or small divots or voids, or distortions in the closure.

In some embodiments, the sealing element is a liner pad formed in the shape of a planar seal ring, and generally formed with a thickened rim 28 which is shown in FIG. 2A. The central area of the sealing element has a thickness which is less than a thickness of rim 28. In the embodiment illustrated in FIG. 2B, the sealing element is in the form of a seal ring having an aperture or a hollow central area which is bounded by an inner edge 29 of the sealing element 20. The sealing element 20 illustrated in FIG. 2C is a liner pad in the form of a seal ring that has a substantially constant thickness between upper surface 24 and lower surface 26. While the sealing elements illustrated in FIGS. 2A through 2C are illustrated as circular, it is important to understand that the form thereof is not limited thereto and the sealing elements can be formed in generally any imaginable shape and size as desired by the end user.

The container body 40 comprises a base (not shown) and outer side walls 50 extending upwardly from the base. The base and outer side walls define a void 60 in the body portion of the container for receiving one or more products such as described herein. In one embodiment, the outer side walls form shoulders 52 at an upper end which lead to a neck portion that terminates in an opening, defining lip 48 having a periphery. As shown in FIG. 1, the neck has an exterior portion adapted to allow the container body to receive and engage the closure 30. The configuration of the container body 40 illustrated in FIG. 1 is generally a bottle. It should be understood that containers useful in the prevent invention can be made in a variety of other configurations suitable for the particular application.

In some embodiments of the invention, it is desired that the sealing elements formed are able to withstand a heat treatment process such as sterilization or heat treatment utilizing a retort process or a hot fill process. For the sake of clarity, it is to be understood that the sealing elements can also be used in processes that are performed generally at room temperature or even below room temperature.

Various retort systems are known in the art, such as retort batch systems and retort continuous processes. Examples of further retort systems include continuous hydrostatic retort systems and continuous agitating retort systems. Both types of systems include a conveyor for carrying foodstuff packaged in containers, a container feeder for delivering packaged foodstuff to the conveyor, a retort chamber for treating the packaged foodstuff with elevated temperature and pressure, and a discharge system for discharging the retorted packaged foodstuff for further packaging and handling. The hydrostatic retort systems include water columns for maintaining elevated pressure in the retort chamber and agitating retort systems include agitators for agitating the foodstuff within its container as the packaged foodstuff travels through the retort system. Such continuous retort systems are often large and expensive and require a large capital investment for the packaged foodstuff manufacturer.

In a typical retort process, the filled container is transported through or placed in a high pressure overheated water bath, wherein the container is heated for a predetermined period of time, generally about 1 to about 50 minutes and preferably from about 1 to about 40 minutes at a temperature generally from about 121° C. (249° F.) to about 130° C. (266° F.) or more, and preferably from about 121° C. (249° F.) to 125° C. (257° F.). As the exterior surface of the container is heated, the packaged contents are heated and the internal pressure within the container increases. Concurrently, in one embodiment the container is submerged to greater depths in a water bath resulting in a counteracting external pressure increase. After the retorting process, the container is cooled, such as in a water bath. The rate of movement in the retort process and in subsequent cooling steps is designed to minimize variations in the internal pressure of the container. After a predetermined period of time, the container is removed from the retort system and allowed to cool to room temperature.

Hot fill processes are relatively inexpensive and utilized as a conventional filling technology that provides extended service life at room or ambient temperature to perishable beverage and liquid food products, such as soft drinks, fruit and vegetable juices, teas, and water containing additives. During a hot fill process, the liquid to be packaged is pasteurized in one embodiment. The container is filled with the product at an elevated or "hot" temperature, such as from about 90° C. to about 100° C. Afterwards, the container is sealed with the closure, with the sealing element located there between and the assembly is cooled, preferably rapidly, which can in some embodiments aid in maintaining product taste and vitamin integrity.

The liner or sealing element cooperatively functions with the container body and the closure to provide an added measure of protection for seal integrity as the container contents are sterilized or heat treated such as by the retort or hot fill process. More specifically, the sealing element functions cooperatively with the closure to provide a pressure against the container body, specifically the container lip. When the closure is attached to the container body at ambient temperature and pressure conditions, the closure may be tightened on the container such that the sealing element is compressed slightly between the container body and the top interior surface of the closure. A sealing area is formed where the sealing element is compressed or sandwiched between the closure and the container lip. When the sealed container is exposed to retort or hot fill conditions, the seal integrity is challenged by the pressure increases within the container.

The sealing element compositions of the present invention utilized to form a desired sealing element include one or more and preferably a plurality of polyolefins, one or more styrenic block copolymers and one or more olefin block copolymers as polymeric components of the compositions. An various embodiments, one or more other components are present in the compositions, for example softeners, friction modifying agents, and other additives.

Polyolefins

In one embodiment, the compositions of the present invention include one or more polyolefins, which as utilized herein are defined as one or more of a polyolefin polymer and a polyolefin copolymer unless otherwise indicated. The term "polyolefin" as used herein excludes olefin block copolymers, which are defined hereinbelow. Polyolefins suitable for use in the compositions of the present invention comprise amorphous or crystalline homopolymers or non-olefin block copolymers of two or more same or different monomers derived from alpha-monoolefins having from 2 to about 12 carbon atoms, and preferably from 2 to about 8 carbon atoms. Examples of suitable olefins include ethylene, propylene, 1-butene, 1-pentene, 1-hexene, 2-methyl-1-propene, 3-methyl-1-pentene, 4-methyl-1-pentene, 5-methyl-1-hexene, and combinations thereof. Polyolefins include, but are not limited to, low-density polyethylene, high-density polyethylene, linear-low-density polyethylene, polypropylene (isotactic and syndiotactic), ethylene/propylene copolymers, and polybutene. Polyolefin copolymers can also include the greater part by weight of one or more olefin monomers and a lesser amount of one or more non-olefin monomers such as vinyl monomers including vinyl acetate, or a diene monomer, etc. Generally, a polyolefin copolymer includes less than 40 weight percent of a non-olefin monomer, desirably less than 30 weight percent, and preferably less than about 10 weight percent of a non-olefin monomer.

In a further embodiment, the polyolefin may optionally include at least one functional group per chain or can be a blend of non-functionalized polyolefins and functionalized polyolefins Functional groups can be incorporated into the polyolefin by the inclusion of for example, one or more non-olefin monomers during polymerization of the polyolefin. Examples of functional groups include, but are not limited to, anhydride groups such as maleic anhydride, itaconic anhydride and citraconic anhydride; acrylates such as glycidyl methacrylate; acid groups such as fumaric acid, itaconic acid, citraconic acid and acrylic acid; epoxy functional groups; and amine functional groups. Functional group-containing polyolefins and methods for forming the same are well known to those of ordinary skill in the art. Functionalized polyolefins are available commercially from sources such as Uniroyal, Atofina, and DuPont. Epoxy modified polyethylenes are available from Atofina as LOTADER®. Acid modified polyethylenes are available from DuPont as FUSABOND®.

In one embodiment, a single polyolefin can be utilized in the sealing elements in compositions of the present invention, for example polypropylene. In other embodiments of the present invention, at least two or at least three different polyolefins are utilized in the sealing element compositions to impart desirable properties thereto. Various polyolefins can be utilized to improve properties such as tensile strength, compression set, and hardness. Preferred polyolefins have the ability to flow under pressure to aid in forming a sealing element in a molten state, but also allow the finished, formed sealing element to have sufficient mechanical strength. Polyolefins also aid in reducing viscosity of the compositions thereby improving the processability thereof. Moreover, when a polyolefin is utilized as a closure or cap, polyolefins also aid in improving adhesion of the sealing element to the closure or cap.

The polyolefins of the present invention can be characterized in one embodiment using melt indices. Therefore, in one embodiment the sealing element compositions include a polyolefin having a melt index greater than 10 grams of polymer per 10 minutes and desirably greater than 11 grams of polymer per 10 minutes and at least one polyolefin having a melt index less than 10 grams per 10 minutes and desirably less than 9 grams per 10 minutes. Melt flow index or melt index when utilized herein is measured according to ASTM D-1238.

For example, in one embodiment a polypropylene having a melt index greater than 10 grams per 10 minutes and desirably greater than 11 grams per 10 minutes is utilized in combination with at least one polyethylene having a melt index less than 10 grams and desirably less than 9 grams per 10 minutes. In a further embodiment, a second polyethylene having a melt index greater than 10 grams and desirably greater than 11 grams per 10 minutes is utilized in combination with the previously mentioned polypropylene and polyethylene.

As the relatively high melt index polyolefins are believed to provide at least the above indicated benefits to the sealing element compositions and sealing elements of the present invention, in various embodiments one or more polyolefins having a melt index greater than 10 grams or 11 grams of polymer per 10 minutes are present in an amount generally from about 60 to about 99 parts, desirably from about 75 to about 98 parts, and preferably from about 80 to about 97 parts based on 100 parts by weight of total polyolefins present. That said, the at least one polyolefin present having a melt index less than 10 grams or 9 grams per 10 minutes is present in an amount generally from about 1 to about 40, desirably from about 2 to about 25 parts and preferably from about 3 to about 20 parts by weight based on 100 parts by weight of total polyolefins present. When two or more different polyolefins are utilized having a melt index greater than 10 grams of polymer per 10 minutes, in various embodiments polypropylene is utilized as one of the relatively high melt index polymers and is present in an amount generally from about 40 to about 85 parts and preferably from about 50 to about 75 parts based on 100 parts by weight of the total polyolefins polymer present having a melt index greater than 10 or 11 grams per 10 minutes. When polyethylene is utilized as a second relatively high melt index polyolefin the amount thereof ranges generally from about 15 to about 60 and preferably from about 25 to about 50 parts based on 100 parts by weight of the total polyolefins polymer present having a melt index greater than 10 or 11 grams per 10 minutes.

Of the polyolefins, substantially homopolymer polyolefins are preferred and polypropylene and polyethylene are desirable. Polypropylene is utilized in a major amount based on the total weight of polyolefins present in at least one embodiment due to the ease of molding, a processability, resistance to chemicals, and desirable mechanical properties.

Polyolefin polymers and copolymers are commercially available from sources including, but not limited to, Chevron, Dow Chemical, DuPont, Exxon Mobil, Huntsman Polymers, Ticona and Westlake Polymer under various designations.

The total amount of polyolefin(s) utilized in the sealing elements and compositions of the present invention ranges generally from about 30 to about 60 parts, desirably from about 35 to about 55 parts, and preferably from about 35 to about 50 parts based on 100 parts by weight of total polyolefin, styrenic block copolymer and olefinic block copolymer. As indicated herein, in a preferred embodiment, regardless of the total amount of polyolefin(s) utilized in the sealing element compositions, the total polyolefin content, on a weight basis, is greater than the total weight of any other class of polymers utilized in the composition. For example, the total weight of polyolefin is greater than the total weight of any styrenic block copolymers utilized in the sealing element composition. Likewise, the polyolefin content by weight is greater than the total weight of any olefinic block copolymers present in the compositions.

Styrenic Block Copolymers

The sealing element compositions of the present invention include one or more styrenic block copolymers. In a preferred embodiment, the styrenic block copolymers have a hard block (A) including aromatic vinyl repeat units and at least one soft polymer block (B) containing two or more repeat units, that are the same or different, and independently derived from olefin monomers. The styrenic block copolymer can be, for example, a triblock copolymer (A-B-A); or a tetrablock or higher multiblock copolymer. In a preferred embodiment, the styrenic block copolymer is a triblock copolymer (A-B-A) having two hard blocks.

Each hard polymer block (A) can have two or more same or different aromatic vinyl repeat units. For example, the block copolymer may contain (A) blocks which are styrene/alpha-methylstyrene copolymer blocks or styrene/butadiene random or tapered copolymer blocks so long as a majority of the repeat units of each hard block are aromatic vinyl repeat units. The (A) blocks are aromatic vinyl compound homopolymer blocks in one embodiment. The term "aromatic vinyl" is to include those of the benzene series, such as styrene and its analogs and homologs including o-methylstyrene, p-methylstyrene, p-tert-butylstyrene, 1,3-dimethylstyrene, alpha-methylstyrene and other ring alkylated styrenes, particularly ring-methylated styrenes, and other monoalkenyl polycyclic aromatic compounds such as vinyl naphthalene, vinyl anthracene and the like. The preferred aromatic vinyl compounds are monovinyl monocyclic aromatics, such as, styrene and alpha-methylstyrene, with styrene being most preferred. When three or more different repeat units are present in hard polymer block (A), the units can be combined in any form, such as random form, block form and tapered form.

Optionally, the hard polymer block (A) can comprise small amounts of structural units derived from other copolymerizable monomers in addition to the structural units derived from the aromatic vinyl compounds. The proportion of the structural units derived from other copolymerizable monomers is desirably 30% by weight or less and preferably 10% by weight or less based on the total weight of the hard polymer block (A). Examples of other copolymerizable monomers include, but are not limited to, 1-butene, pentene, hexene, conjugated dienes such as butadiene or isoprene, methyl vinyl ether, and other monomers.

The soft polymer block (B) of the styrenic block copolymer includes two or more same or different structural units. Soft polymer block (B) can be derived from olefin monomers generally having from 2 to about 12 carbon atoms and can include, for example, ethylene, propylene, butylene, isobutylene, etc. When the soft polymer block (B) has structural units derived from three or more repeat units, the structural units may be combined in any form such as random, tapered, block or any combination thereof. In one embodiment, the soft polymer block does not contain any unsaturated bonds.

In additional embodiments of the present invention, the styrenic block copolymer can have at least one soft polymer block (B) including two or more repeat units that are the same or different, independently derived from one or more of an olefin monomer and a diene monomer. When the diene monomer is present, the styrenic block copolymer is preferably hydrogenated or substantially hydrogenated. The conjugated diene monomers preferably contain from 4 to about 8 carbon atoms with examples including, but not limited to, 1,3-butadiene (butadiene), 2-methyl-1,3-butadiene (isoprene), 2,3-dimethyl-1,3-butadiene, 1,3-pentadiene (piperylene), 1,3-hexadiene, and the like. Therefore, in one embodiment, the soft polymer block (B) can have structural units derived from one or more of an olefin monomer(s) and diene monomer(s).

As indicated hereinabove, when the soft polymer block (B) has structural units derived from three or more repeat units, the structural units may be combined in any form.

The styrenic block copolymers may be prepared utilizing bulk, solution or emulsion or other techniques as known in the art. In one embodiment, the amount of hard block ranges from about 10% to about 40% by weight based on the total weight of the styrenic biotic copolymer.

Optionally, the soft polymer block (B) can include small amounts of structural units derived from other copolymerizable monomers in addition to the structural units described. In this case, the proportion of the other copolymerizable monomers is generally 30% by weight or less, and preferably 10% by weight or less based on the total weight of the soft polymer block (B) of the styrenic block copolymer. Examples of other copolymerizable monomers include, for example, styrene, p-methylstyrene, α-methylstyrene, and other monomers that can undergo ionic polymerization.

In various embodiments, the styrenic block copolymers are styrene-ethylene/propylene (SEP) styrene-ethylene/propylene-styrene (SEPS), styrene-ethylene/butylene-styrene (SEBS), styrene-ethylene/ethylene/propylene-styrene (SEEPS), styrene-isobutylene-styrene (SIBS), styrene-butadiene-styrene (SBS), and styrene-isoprene-styrene (SIS), or a combination thereof.

Styrenic block copolymers are available in the art from sources such as Kraton Polymers of Houston, Tex., as Kraton G-1641, G-1642, G-1651, G-1633; Kuraray Co., Ltd. of Tokyo, Japan as SEPTON™ styrenic block copolymers, for example SEPTON™ 4033, 4044, 4055, 8004, 8006, TSRC Corporation of Taiwan as Taipol 6151, 6154, and Danasol Elastomers LTD of Houston, Tex. as Calprene 6170WS.

The amount of the one or more styrenic block copolymers utilized in the sealing elements and compositions of the present invention ranges generally from about 5 to less than 50 parts, desirably from about 10 to about 40 and preferably from about 15 to about 30 parts based on 100 parts by weight of total polyolefin, polymer, styrenic block copolymer, and olefin block copolymer.

In addition to imparting good mechanical properties and compression set, styrenic block copolymers also provide for good retention of softener oil and minimize the exudation oil in the sealing elements and compositions of the present invention.

Olefin Block Copolymers

In a further embodiment of the present invention, the thermoplastic elastomer composition comprises an olefin or olefinic block copolymer (OBC). Olefin block copolymers provide a balance of flexibility and high temperature resistance as well as desirable elastic recovery and compression set properties at both ambient and elevated temperatures in the formulations of the invention. Improved abrasion resistance can also be achieved utilizing olefin block copolymers in the sealing element compositions. The olefin block copolymer contains therein two or more, and preferably three or more segments or blocks. Generally olefins having from 2 to about 12 carbon atoms and preferably from about 2 to about 8 carbon atoms are utilized. The olefin block copolymers can comprise alternating blocks of hard and soft segments. As known in the art, chain or catalytic shuttling technology allows variable yet controllable distribution of block lengths to be produced. Olefin block copolymers are characterized by having a broader molecular weight distribution compared to traditional anionic block copolymers made by a living polymerization.

Olefin block copolymers are available for example DOW as INFUSE™ Further description of olefin block copolymers is set forth in WO 2005/090425; WO 2005/090427; WO 2005/090426; U.S. 2007/0219334; U.S. 20100069574; U.S. 20100298515; U.S. Pat. No. 5,844,045; U.S. Pat. No. 5,869,575; U.S. Pat. No. 6,448,341; U.S. Pat. No. 6,538,070; U.S. Pat. No. 6,545,088; U.S. Pat. No. 6,566,446; U.S. Pat. No. 7,608,668; and U.S. Pat. No. 7,671,106 herein fully incorporated by reference.

The olefin block copolymers as indicated herein are present in an amount less than the total amount of polyolefins present, by weight. Accordingly, the olefin block copolymers are present in the sealing elements and compositions in an amount less than 50 parts, generally from about 10 to about 45 parts, desirably from about 20 to about 40 parts and preferably from about 25 to about 40 parts by weight per 100 parts by weight of the total polymer of polyolefin polymer, styrenic block copolymer and olefin block copolymer. Moreover, the olefin block copolymers are present in an amount less than 40 parts by weight, desirably less than 30 parts by weight and preferably less than 25 parts by weight based on 100 total parts by weight of the composition or sealing element formed therefrom.

Softeners

The sealing element compositions of the present invention in various embodiments include a softener such as a mineral oil softener, or synthetic resin softener, a plasticizer, a vegetable oil, or combinations thereof. The softener can beneficially reduce the temperatures at which the compositions are processable. Oil softeners are generally mixes of aromatic hydrocarbons, naphthene hydrocarbons and paraffin, i.e., aliphatic, hydrocarbons. Those in which carbon atoms constituting paraffin hydrocarbons occupy 50% by number or more of the total carbon atoms are called "paraffin oils". Those in which carbon atoms constituting naphthene hydrocarbons occupy 30 to 45% by number of the total carbon atoms are called "naphthene oils", and those in which carbon atoms constituting aromatic hydrocarbons occupy 35% by number or more of the total carbon atoms are called "aromatic oils". In one embodiment, paraffin oils and/or plasticizers are preferably utilized as a softener in compositions of the present invention. Examples of synthetic resin softeners include, but are not limited to, polyisobutylene, and polybutenes. When present, the softeners range in an amount from about 10 to about 50 parts, and preferably from about 20 to about 40 parts by weight based on 100 total parts by weight of the composition.

Other Components

The sealing element compositions and sealing elements of the present invention may optionally include additional additives including, but not limited to lubricants, light stabilizers, pigments, heat stabilizers, processing aids, mold release agents, flow enhancing agents, platelet fillers and non-platelet fillers. Examples of fillers for use in the compositions include, but are not limited to, one or more of starch, calcium carbonate, talc, clay, silica, titanium dioxide, barium sulfate, mica, glass fibers, whiskers, carbon fibers, magnesium carbonate, glass powders, metal powders, kaolin, graphite, and molybdenum disulfide. All additives should be screened to ensure that they are approved by various regulatory authorities for use in direct food contact, when necessary.

In one embodiment of the present invention, the sealing element compositions include talc. Talc functions as an agent in the compositions that reduces the friction between the composition and another surface the composition contacts. Stated in another manner, the talc aids in sliding of the sealing elements in relation to another surface, such as the rim of a container. The talc, when present, is utilized in an amount from about 0:1 to about 30 parts and preferably from about 10 to about 20 per 100 parts by weight of the composition.

The hardness of the compositions and sealing elements formed therewith generally range from Shore A 50 to Shore A 90, desirably from Shore A 55 to 85, and preferably from Shore A 60 to 80, measured according to ASTM D-2240.

In one embodiment of the present invention, the composition, a sealing element, has a compression set greater than 60% at 7 days and 70° C. according to ASTM D-395. The compositions and sealing elements in some embodiments have a tensile strength greater than 600 psi and elongation to break greater that 600% measured according to ASTM-412.

In one embodiment, the sealing element is formed as a cap liner pad having a melt index (200° C., 5 Kg) from about 25 to about 30 grams per 10 minutes measured according to ASTM D-1238.

In a further embodiment, the sealing element is a seal ring having a melt index of from about 30 to about 50 grams per 10 minutes (200° C., 5 Kg) as measured according to ASTM D-1238.

In a preferred embodiment, the sealing element compositions of the present invention are characterized as having desirable peak melting temperature ranges and peak crystallization temperature ranges. In one embodiment the sealing element compositions have a first peak melting temperature that ranges from about 60° C. to about 85° C., and preferably from about 65° C. to about 80° C., and a second peak melting temperature that ranges from about 110° C. to about 125° C., and preferably from about 115° C. to about 120° C. Due to the presence of polypropylene, a third melting temperature generally ranges from about 145° C. to about 165° C. and preferably from about 150° C. to about 160° C.

The compositions can have a first peak crystallization temperature that has split peaks from about 90° C. to about 125° C. and preferably from about 95° C. to about 110° C. due to the presence of an olefin block copolymer. A second peak crystallization temperature ranges from about 50° C. to about 65° C. and preferably from about 54° C. to about 60° C. As evident from the melting and crystallization temperature ranges, the sealing element compositions of the present invention provide broad processing windows that are desirable to sealing element manufacturers. As utilized herein the melting and crystallization temperatures were measured on a DSC Q2000 instrument from TA Instruments, New Castle, Del., measured according to ASTM D3418-08 with rates of cooling and heating at 10° C. per minute, and sample sizes varying from 5 to 10 milligrams.

The compositions and sealing elements formed therefrom exhibit low gas permeability and therefore are particularly useful in sealing food and liquid containers where the low permeability values prevent or lessen unintended gases from contacting the contents within the container. The compositions and sealing elements of the present invention desirably exhibit average permeability values less than 450, desirably less than 350, and preferably less than 350 or 300 $CM^3$-MM/[$M^2$-D-ATM] as measured according to ASTM F1927 using a MOCON® Ox-Tran 2/61 manufactured by MOCON Inc., Minneapolis, Minn.

As indicated herein, the closure is designed to form a seal with a container body, with the sealing element being disposed therebetween. In a preferred embodiment, the closure is a thermoplastic or thermoset material. In one embodiment, the closure is a thermoplastic and comprises one or more of a polyolefin and a polyester. Suitable polyolefins have been described hereinabove with respect to the sealing element compositions. Polypropylene closures are preferred in one embodiment. Examples of suitable polyesters include polyethylene terephthalate (PET) and polyethylene naphthalate.

The container may be manufactured from a wide variety of materials such as known in the art for container use. Preferably the container is a rigid or semi-rigid thermoplastic polymeric material. Preferred materials for the container body are those thermoplastics approved by the FDA or regulatory body for contact with food or foodstuffs. In a preferred embodiment, the container body is a thermoplastic and comprises one or more of a polyolefin and PET.

The sealing element compositions of the present invention are useful to form a wide variety of sealing elements having different dimensions or forms. For example, as illustrated in FIGS. 2A-2C the sealing elements can be formed in the form of a ring, disc, or any other desired shape, for example in a square or rectangular form, etc. Depending upon the configuration of the container and closure to be sealed, one or more different portions of the sealing element can have a thickness greater than another portion of the sealing element, see FIG. 2A for example which illustrates a sealing element 20 having a rim 24 of greater thickness than a central area of the sealing element.

The sealing elements of the present invention can be utilized in generally any application where a sealing element is required as known to those of ordinary skill in the art. Examples of suitable applications include, but are not limited to, closure liners for foodstuff and liquid containers as well as containers designed to house non-foodstuff items.

The sealing element compositions of the present invention can be produced utilizing in any of numerous processes known, in the art including, but not limited to, extrusion, injection molding, compression molding, and calendaring.

Methods for producing sealing elements of different forms have been disclosed hereinabove and are incorporated by reference. Other methods of manufacturing sealing elements are known to those of ordinary skill in the art as well. In one particularly useful embodiment, a sealing element is formed by extruding a quantity of a sealing element composition and then forming the extrudate into a sealing element, such as by stamping or compressing the extrudate into a desired form. In one embodiment, the extrudate can be dropped or placed in a closure and subsequently stamped or compressed there against in order to mold the extrudate into the desired sealing element shape within the closure at a desired location. As one non-limiting example of a viable manufacturing process, these steps are repeated at a rate to form 200 to 1800 sealing elements per minute. The melt rheology of the sealing element composition has to meet the manufacturing rate. Obviously, the amount of the sealing element composition extrudate will vary depending upon the size of the sealing element to be formed, thickness thereof, and the like.

EXAMPLES

The examples set forth in the following tables were prepared by melt mixing the indicated components using a twin screw extruder at a temperature of about 220° C. The properties were measured using samples injection molded at 210° C. prepared from the respective formulations.

TABLE 1

|  | Comparative 1 | Comparative 2 | Example 1 | Example 2 | Example 3 |
|---|---|---|---|---|---|
| STYRENIC BLOCK COPOLYMER[1] | — | — | 40 | 50 | 40 |
| OLEFIN BLOCK COPOLYMER[2] | 100 | 90 | 60 | 55 | 55 |
| STYRENIC BLOCK COPOLYMER[3] | — | 10 | — | — | — |
| POLYPROPYLENE[4] 12 MI | 35 | 23 | 45 | 40 | 40 |
| POLYETHYLENE[5] 12 MI | — | — | 20 | 25 | 15 |
| POLYETHYLENE[6] MI = 8 | — | — | 10 | 10 | 13 |
| ETHYLENEVINYL ACETATE | — | — | — | — | 7 |
| SOFTENER[7] | 70 | 62.5 | 85 | 85 | 30 |
| CRODAMIDE ER | 1.8 | 0.9 | 1.8 | 1.8 | 6.40 |
| CRODAMIDE VR | 1 | 0.9 | 1 | 1 | — |
| IRGANOX 1010 | 0.19 | 0.19 | 0.19 | 0.19 | 0.5 |
| POLYISOBUTYLENE OIL | — | — | — | — | 60.00 |
| TOTAL (parts by weight) | 207.99 | 187.49 | 262.99 | 267.99 | 266.90 |
| HARDNESS, Shore A[8] (inst./5 sec) | 63/58 | 60/55 | 74/69 | 80/75 | 77/72 |
| MI 200° C., 5KG[9] (g/10 min) | 38 | 26 | 28 | 31 | 28 |
| COMPRESSION SET[10] 23° C. 7 DAYS (%) | 27 | 25 | — | — | — |
| COMPRESSION SET[10] 23° C. 22 HRS (%) | — | — | 25 | 25 | — |
| COMPRESSION SET[10] 70° C. 7 DAYS (%) | 46 | 45 | — | — | — |
| COMPRESSION SET[10] 70° C. 22 HRS (%) | — | — | 52 | 52 | — |
| COMPRESSION SET[10] 85° C. 30 MIN (%) | — | — | 37 | 39 | — |
| TENSILE STRENGTH[11] (psi) | 850 | 990 | 900 | 960 | 740 |
| 300% MODULUS[12] (psi) | 320 | 300 | — | — | 536 |
| % ELONGATION[13] | 1430 | 1350 | 850 | 760 | 650 |
| 1$^{st}$ LOW T MELTING POINT[14] (° C.) | 63 | 77 | 68 | 63 | — |
| 2nd MELTING POINT PEAK[14] (° C.) | 116 | 115 | 119 | 119 | — |
| 3$^{rd}$ MELTING POINT PEAK[14] (° C.) | 158 | 158 | 155 | 159 | — |
| 1$^{st}$ high temp CRYSTALLIZATION PEAK 1[15] (° C.) | 103/94 | 102/90 | 106/100 | 109/95 | — |
| 2$^{nd}$ high temp CRYSTALLIZATION PEAK 1[15] (° C.) | 60 | 58 | 58 | 60 | — |
| PERMEABILITY[16] AVG CM$^3$-MM/[M$^2$-D-ATM] | — | — | 254 | 274 | — |

[1]Kurraray, Septon 4055;
[2]Dow Infuse D9000;
[3]Calprene 6170 WS;
[4]Ineos Polypropylene;
[5]Exxon Mobil L6202;
[6]Exxon Mobile polyethylene;
[7]Krystol 550;
[8]ASTM D-2240;
[9]ASTM D-1238;
[10]ASTM D-395;
[11]ASTM 412;
[12]ASTM 412;
[13]ASTM 412;
[14]ASTM D-3814-08, at a rate of heating 10° C./min.;
[15]ASTM D-3814-08, at a rate of cooling 10° C./min;
[16]ASTM F1927 using Mocon Ox-Tran 2/21.

Comparative examples 1 and 2 include relatively high amounts of an olefin block copolymer which were found more difficult to process due to the observed viscosity at about 200° C. being too low. Examples 1 and 0.2 of the invention include a high amount of polypropylene, yet have desirable seal properties as indicated in Table 1 as well as viscosities and also desirable processability. The compositions of the invention also exhibit beneficial permeability values as also set forth in Table 1. The compositions according this invention are further characterized with multiple melting temperatures and also multiple crystallization temperatures. The first melting temperature around 63 to 77° C. is due the presence of friction reducing agents. The second melting temperature around 116 to 119° C. is due the presence of OBC. The third melting temperature around 152 to 159° C. is due the presence of polypropylene. The presence of OBC in the compositions according to this invention is further characterized with the presence of split or double crystallization peaks from 95 to 110° C.

TABLE 2

|  | Example 3 | Example 4 | Example 5 | Example 6 |
|---|---|---|---|---|
| STYRENIC BLOCK COPOLYMER[1] | 40 | 40 | 50 | 50 |
| OLEFIN BLOCK COPOLYMER[2] | 60 | 55 | 55 | 55 |
| POLYPROPYLENE[4] 12 MI | 45 | 45 | 40 | 40 |
| POLYETHYLENE[5] 12MI | 20 | 20 | 20 | 20 |
| POLYETHYLENE[6] MI = 8 | 10 | 10 | 10 | 10 |
| TALC[17] | 10 | 20 | 10 | 20 |
| SOFTENER[7] | 90 | 85 | 95 | 95 |
| CRODAMIDE ER | 1.8 | 1.8 | 1.8 | 1.8 |
| CRODAMIDE VR | 1 | 1 | 0.5 | 0.5 |
| IRGANOX 1010 | 0.19 | 0.19 | 0.19 | 0.19 |
| TOTAL (parts byweight) | | | | |
| MI 200° C., 5KG[9] (g/10 min) | 28 | 27 | 22 | 22 |
| HARDNESS (inst.) Shore A[8] | 75. | 80 | 77 | 80 |
| COMPRESSION SET[10] 23° C. for 22 hours (%) | 24 | 25 | 23 | 25 |
| COMPRESSION SET[10] 70° C. for 22 hours (%) | 47 | 50 | 46 | 45 |
| COMPRESSION SET[10] 85° C. for 30 min (%) | 41 | 40 | 34 | 35 |
| TENSILE STRENGTH[11] (psi) | 1140 | 1145 | 1065 | 1067 |
| 300% MODULUS[12] (psi) | 595 | 608 | 532 | 534 |
| % ELONGATION[13] | 800 | 797 | 791 | 805 |

[17]MICROTUFF 9103 W, from Minelco Specialties.

[17]MICROTUFF 9103 W, from Minelco Specialties.

Table 2 shows examples of compositions and properties containing talc that are prepared according to this invention. The properties such as hardness, melt flow, compression set, tensile strength and elongation are desirable as specified in this invention. The incorporation of a filler, e.g. talc, to the compositions as specified in this invention is suitable for forming a sealing element. It further offers an alternative solution for making sealing elements for applications where a translucent color is not a critical concern.

While in accordance with the patent statutes, the best mode and preferred embodiment have been set forth, the scope of the invention is not limited thereto, but rather by the scope of the attached claims.

What is claimed is:

1. A polymeric sealing element comprising or obtainable from a composition,
comprising:
a styrenic block copolymer;
an olefin block copolymer including two or more different olefin blocks, each olefin block including olefins having from 2 to about 12 carbon atoms;
polyolefin polymers comprising a first polyolefin polymer having a melt index less than 10 grams per 10 min; a second polyolefin polymer having a melt index greater than 10 grams per 10 min, and
a softener, wherein the olefin block copolymer and the styrenic block copolymer are each present in an amount of less than 50 parts by weight per 100 parts by weight of the total polymer of the polyolefin polymers, the olefin block copolymer and the styrenic block copolymer, and wherein the polyolefin polymer is present in an amount by weight greater than each of the amounts of the styrenic block copolymer and olefin block copolymer, wherein melt index is determined according to ASTM D-1238.

2. The composition according to claim 1, wherein the olefin block copolymer is present in an amount from about 10 to about 45 parts per 100 parts by weight of the total polymer, wherein the styrenic block copolymer is present an amount of about 10 to 40 parts per 100 parts by weight of the total polymer, and wherein two or more different polyolefins having a melt index greater than 10 grams are present and include polypropylene and polyethylene.

3. The composition according to claim 2, wherein the styrenic block copolymer comprises one or more of SEBS, SEEPS, and SIBS, and wherein the sealing element has an average permeability of less than 350 $CM^3$-MM/[$M^2$-D-ATM] according to ASTM F1927.

4. The composition according to claim 1, wherein the softener comprises an aliphatic oil, or polyisobutylene oil, or a mixture thereof, wherein the composition has a first peak melting temperature from 60° C. to 75° C., and a second peak melting temperature from 110° C. to 125° C., and a third melting temperatures from 145° C. to 165° C. each measured according to ASTM D-3418-08 at a rate of heating of 10° C./min.

5. The composition according to claim 4, wherein the composition is characterized to have a split or double crystallization peaks from 90° C. to 125° C. measured according to ASTM D-3418-08 at a rate of cooling of 10° C./min, and wherein the sealing element has a hardness of Shore A 50 to Shore A 90 as measured according to ASTM D-2240.

6. The composition according to claim 2, wherein the composition has a Shore A hardness from 55 to 90 measured according to ASTM D-2240, a compression set less than 60% at 7 days and 70° C. according to ASTM D-395, a tensile strength greater than 600 psi according to ASTM-412, and an elongation to break greater than 600% according to ASTM-412, wherein the polypropylene polymer is present in an amount from about 40 to about 85 parts per 100 parts by weight of the total polyolefin polymers, wherein the polyethylene polymer is present in an amount from about 15 to about 60 parts per 100 parts by weight of total polyolefin polymers, wherein the styrenic block copolymer is present in an amount from about 15 to about 30 parts by weight per 100 parts of the total polymer, wherein the olefin block copolymer is present an amount from about 20 to about 40 parts by weight per 100 parts of the total polymer and wherein the sealing element has an average permeability of less than 300 $CM^3$-MM/[$M^2$-D-ATM] measured according to ASTM F-1927.

7. A polymeric sealing element comprising or obtainable from a composition, comprising:
polyolefin polymer;
an olefin block copolymer including two or more different olefin blocks, each olefin block including olefins having from 2 to about 12 carbon atoms;
a styrenic block copolymer; and
a softener, wherein the olefin block copolymer and the sytrenic block copolymer are each present in an amount of less than 50 parts by weight per 100 parts by weight of the total polymer of the polyolefin polymer, the olefin block copolymer and the styrenic block copolymer, wherein the polyolefin polymer is present in an amount greater than each of the amount of the styrenic block copolymer and the olefin block copolymer, and wherein the olefin block copolymer is present in an amount less than 40 parts per 100 parts by weight of the composition.

8. The composition according to claim 7, wherein the olefin block copolymer is present in an amount from about 10 to about 45 parts per 100 parts by weight of the total polymer, and wherein the styrenic block copolymer is present in an amount of about 10 to 40 parts per 100 parts by weight of the total polymer.

9. The composition according to claim 8, wherein the styrenic block copolymer comprises one or more of SEBS, SEEPS, and SIBS.

10. The composition according to claim 9, wherein the polyolefin polymer comprises polyethylene and polypropylene, and wherein the polypropylene has a melt index greater than 10 grams per 10 min measured according to ASTM D-1238.

11. The composition according to claim 10, wherein the polyethylene includes a first polyethylene polymer having a melt index greater than 10 grams per 10 min and a second polyethylene polymer having a melt index less than 10 grams per 10 min, all measured according to ASTM D-1238, and wherein the sealing element has an average permeability of less than 300 $CM^3$-MM/[$M^2$-D-ATM] measured according to ASTM F-1927.

12. The composition according to claim 7, wherein the composition includes a friction reducing agent in an amount from about 0.1 to about 3.0 parts per 100 total parts of the composition.

13. The composition according to claim 11, wherein the total polyolefin polymer is present in an amount from about 30 to about 60 parts per 100 parts by weight of the total polymer, and wherein the sealing element has a hardness of Shore A 50 to Shore A 90 measured according to ASTM D-2240.

14. The composition according to claim 13, wherein the composition has a first peak melting temperature from 60° C. to 75° C., and a second peak melting temperature from 110° C. to 125° C. measured according to ASTM D3418-08 at a rate of heating of 10° C./min.

15. The composition according to claim 13, wherein the composition is characterized to have a first peak crystallization temperature from 110° C. to 125° C. and a second peak crystallization temperature of 100° C. to 110° C. measured according to ASTM 03418-08 at a rate of cooling of 10° C./min, and wherein the sealing element has a hardness of Shore A 50 to Shore A 90.

* * * * *

UNITED STATES PATENT AND TRADEMARK OFFICE
CERTIFICATE OF CORRECTION

PATENT NO. : 8,552,117 B1
APPLICATION NO. : 13/495503
DATED : October 8, 2013
INVENTOR(S) : Biing-Lin Lee, Kevin G. Cai and Edward T. Kopesky It is certified that error appears in the above-identified patent and that said Letters Patent is hereby corrected as shown below:

In the Claims

Claim 15, column 18, line 61: change "ASTM 03418-08" to "ASTM D3418-08"

Signed and Sealed this
Tenth Day of December, 2013

Margaret A. Focarino
*Commissioner for Patents of the United States Patent and Trademark Office*